April 25, 1961

EIICHI GOTO 2,981,473

ELECTRIC MULTIPLICATION CIRCUIT

Filed April 20, 1956

4 Sheets-Sheet 1

INVENTOR.
E. Goto
BY
Mascock Downing & Seebold
ATTORNEYS

April 25, 1961 EIICHI GOTO 2,981,473

ELECTRIC MULTIPLICATION CIRCUIT

Filed April 20, 1956 4 Sheets-Sheet 2

INVENTOR.
E. Goto
BY
Glascock Downing & Seebold
ATTORNEYS

April 25, 1961

E. GOTO 2,981,473

ELECTRIC MULTIPLICATION CIRCUIT

Filed April 20, 1956

4 Sheets-Sheet 3

INVENTOR.
E. Goto
BY
Glascock Downing & Seebold
ATTORNEYS

April 25, 1961 EIICHI GOTO 2,981,473

ELECTRIC MULTIPLICATION CIRCUIT

Filed April 20, 1956 4 Sheets-Sheet 4

Fig. 6A.

| NO. | Input | Output |
|---|---|---|
| 1 | $x_0 y_0 z_0$ | $w_0$ |
| 2 | $-x_0 y_0 z_0$ | $-w_0$ |
| 3 | $x_0 -y_0 z_0$ | $-w_0$ |
| 4 | $x_0 y_0 -z_0$ | $-w_0$ |
| 5 | $-x_0 -y_0 z_0$ | $w_0$ |
| 6 | $-x_0 y_0 -z_0$ | $w_0$ |
| 7 | $x_0 -y_0 -z_0$ | $w_0$ |
| 8 | $-x_0 -y_0 -z_0$ | $-w_0$ |

Fig. 6B.

| Input | | | Output |
|---|---|---|---|
| X | Y | Z | W |
| 1 | 1 | 1 | 1 |
| 1 | 1 | 0 | 0 |
| 1 | 0 | 1 | 0 |
| 0 | 1 | 1 | 0 |
| 1 | 0 | 0 | 1 |
| 0 | 1 | 0 | 1 |
| 0 | 0 | 1 | 1 |
| 0 | 0 | 0 | 0 |

INVENTOR.
E. Goto
BY Glascock Downing & Seebold
ATTORNEYS

United States Patent Office 2,981,473

Patented Apr. 25, 1961

2,981,473

ELECTRIC MULTIPLICATION CIRCUIT

Eiichi Goto, 1416 4-chome, Nakameguro, Meguro-ku, Tokyo-to, Japan

Filed Apr. 20, 1956, Ser. No. 579,572

Claims priority, application Japan Apr. 25, 1955

6 Claims. (Cl. 235—194)

The present invention relates to an electric multiplication circuit, and more particularly to an electric multiplication circuit in which are used a plurality of nonlinear circuit elements and a plurality of linear circuit elements coupling the input and output signals thereof with the said nonlinear circuit elements.

Heretofore, a ring modulator, utilizing four nonlinear circuit elements such as rectifiers and linear circuit elements coupling the input and output signals thereof with the above-mentioned nonlinear circuit elements, was well known and has been widely used in various fields of electric and electronic engineering. A ring modulator has two input signals $S_x$ and $S_y$ and one output signal $S_w$. Said output signal $S_w$ includes the product $S_x \cdot S_y$ and is indicated as a factor: $S_w = k \cdot S_x \cdot S_y$. Therefore, the functions of a ring modulator can be explained clearly by considering the same as an electric double multiplication circuit.

The object of the present invention is to provide a remarkably simple electric triple multiplication circuit, having three input signals $S_x$, $S_y$ and $S_z$ and one output signal $S_w$ including the triple product $S_x \cdot S_y \cdot S_z$ of said three input signals as a factor, by utilizing four nonlinear circuit elements in a ring modulator.

Said objects and the other objects of the present invention have been accomplished by the electric multiplication circuit having three input signals and one output signal, which comprises four nonlinear circuit elements, the first linear circuit and the second linear circuit, said nonlinear circuit elements having substantially the same characteristics, said first linear circuit receiving said three input signals and distributing said signals among said four nonlinear elements through which said signals are passed separately, and said second linear circuit receiving said distributed four signals and producing said output signal having the triple product of said three input signals as a factor.

The electric triple multiplication circuit of the present invention can be employed for various purposes. First, the circuit according to the present invention can be applied to a triple multiplication circuit of electric analogue computers and to a double modulation circuit capable of carrying out the balanced modulating processes simultaneously; namely, the balanced modulation of the first carrier wave and the balanced modulation of the second carrier wave by the modulated first carrier wave. In these cases, is utilized the property that the output signal of such circuit includes the triple product of the three input signals thereof as a factor. Secondly, the same can be applied to a checking circuit of the triple coincidence of the three input signals thereof and to a double coincidence gating circuit. In these cases, there is utilized such property of the circuit of the present invention that an output signal is produced if and only if the three input signals coexist. The above-mentioned property is derived easily from the fact that the output signal includes the triple product of the three input signals as a factor. Thirdly, the same can be applied to a binary full adder circuit of electric digital computers and to a two staged polarity reversing switch circuit. In these cases, there is utilized such property of the circuit of this invention that the polarity of the output signal is reversed if the polarity of any one of the three input signals is reversed. The above-mentioned property is also derived easily from the fact that the output signal includes the triple product of the three input signals as a factor.

The accompanying drawings show for the purpose of exemplification without limiting the invention or claims thereto certain practical embodiments illustrating the principles of the present invention wherein:

Fig. 1 is an electric connection diagram illustrating the basic principle of this invention.

Figs. 2A, 2B, 2C and 2D, respectively, show the connection diagrams of one embodiment of the linear circuit, which is a component element of the present invention, and constitutes the means for distributing or collecting the signals.

Figs. 6A and 6B are tables explaining the function of the triple multiplication circuit according to the present invention.

Figure 1:
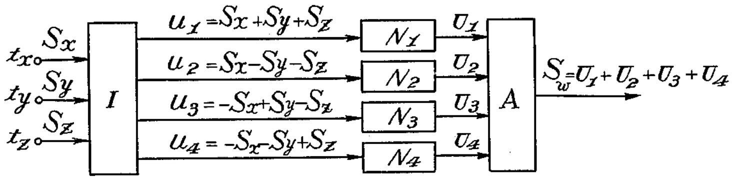

Referring to Fig. 1, the three input signals $S_x$, $S_y$ and $S_z$ are, respectively, impressed on the three input terminals $t_x$, $t_y$ and $t_x$. I is a linear circuit for the distribuation of said input signals. That is, it receives said three input signals $S_x$, $S_y$ and $S_z$ and produces the following four signals $U_1$, $U_2$, $U_3$ and $U_4$.

$$\left.\begin{aligned} u_1 &= S_x + S_y + S_z \\ u_2 &= S_x - S_y - S_z \\ u_3 &= -S_x + S_y - S_z \\ u_4 &= -S_x - S_y + S_z \end{aligned}\right\} \quad (1)$$

Figure 2A:
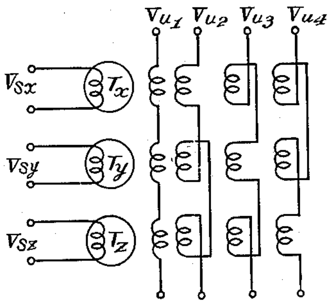
Figure 2B:
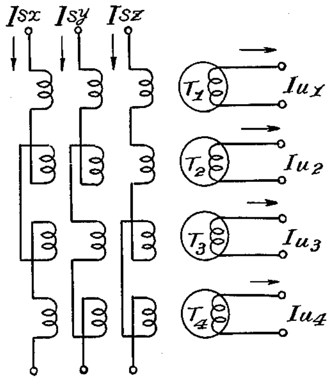

Said four signals $u_1$ $u_2$, $u_3$ and $u_4$ are distributed among the four nonlinear circuit elements $N_1$, $N_2$, $N_3$ and $N_4$. When the input signals $S_x$, $S_y$ and $S_z$ are given in the form of voltages $V_{sx}$, $V_{sy}$ and $V_{sz}$, the linear circuit I can be realized as shown in Fig. 2A. In order to simplify the drawings, certain windings of the transformers $T_x$, $T_y$ and $T_z$ are shown separately, but it should be understood that all of the windings are wound closely together. In Fig. 2A, the input voltages $V_{sx}$, $V_{sy}$ and $V_{sz}$ are, respectively, impressed on the primary windings of the three transformers $T_x$, $T_y$ and $T_z$. The four signals $V_{u1}$, $V_{u2}$, $V_{u3}$ and $V_{u4}$, which are distributed among the four nonlinear circuit elements $N_1$, $N_2$, $N_3$ and $N_4$, are taken out from the series-connected secondary windings of said four transformers. Furthermore, when the input signals are given in the form of currents $I_{sx}$, $I_{sy}$ and $I_{sz}$, such linear circuit I for the distribution of the input signals as shown in Fig. 1 can be realized as shown in Fig. 2B. In Fig. 2B, four transformers $T_1$, $T_2$, $T_3$ and $T_4$ are used. The primary windings of said transformers are connected in series and the input currents $I_{sx}$, $I_{sy}$ and $I_{sz}$ are impressed thereupon. The four nonlinear circuit elements $N_1$, $N_2$, $N_3$ and $N_4$ are, respectively, connected to the secondary windings of said transformers and the distributed currents $I_{u1}$, $I_{u2}$, $I_{u3}$ and $I_{u4}$ flow, respectively, through said nonlinear circuit elements.

In Fig. 1, for the four nonlinear circuit elements $N_1$, $N_2$, $N_3$ and $N_4$ may comprise nonlinear resistors, vacuum tubes, transistors, ferro-magnetic-cored saturable inductors, ferro-electric capacitors, gas discharge tubes and the like, which are generally used and have nonlinear characteristics, the output thereof not being in direct proportion to the input. The four nonlinear circuit elements $N_1$, $N_2$, $N_3$ and $N_4$ are so made as to have substantially equivalent operating characteristics. Hence, the outputs $U_1$, $U_2$, $U_3$ and $U_4$ to be taken out of each nonlinear circuit element $N_i$ stands in an entirely similar relationship with regard to each input signal $u_i$, where $i$ is a running index, 1, 2, 3 and 4. In other words, all of the four functions $U_i$ $(u_i)$, describing the relationship between the input signal and the output signal of each one of the four nonlinear circuit elements $N_1$, $N_2$, $N_3$ and $N_4$, have the same form. Furthermore, each of said nonlinear circuit elements is made so as to reverse the polarity of the output signal thereof when the polarity of the input signal thereof is reversed. In other words, the function $U_i$ $(u_i)$ is made to be an odd function:

$$U_i(-u_i) = -U_i(u_i)$$

In case ferro-magnetic-cored inductors, ferro-electric capacitors or symmetric nonlinear resistors having no rectifying action are used as the nonlinear circuit elements $N_i$, the relationship between the input signal and the output signal is given by the following Formula 2:

$$U_i = a_1u_i + a_3u_i^3 + a_5u_i^5 + \dots \quad (2)$$

wherein $a_1$, $a_3$, $a_5$ . . . are constants and $U_i$ is clearly an odd function. In case nonlinear reactors are used, each term has to be integrated or differentiated with regard to time and the result is substantially the same. However, in case nonlinear circuit elements such as diodes, rectifiers, vacuum tubes or transistors are used, the relationship becomes as follows:

$$U_i = a_0 + a_1u_i + a_2u_i^2 + a_3u_i^3 + \dots \quad (3)$$

wherein $a_0$, $a_1$, $a_2$, $a_3$ . . . are constants and $U_i$ is not an odd function due to the presence of even power terms. In such a case, a filter or the like has to be used on the output side so as to take out only the fundamental and the odd harmonic components separately from the even harmonics. This process eliminates the effects of the even power terms in the Formula 3, since the even power terms generate only even harmonics of the input signal.

A in Fig. 1 is a linear circuit for the collection of the output, which collects four signals $U_1$, $U_2$, $U_3$ and $U_4$ passed through the four nonlinear circuit elements $N_1$, $N_2$, $N_3$ and $N_4$ and then sends out the output signal $S_w$. The output signal $S_w$ is such sum of the four signals $U_1$, $U_2$, $U_3$ and $U_4$ as shown in the following Formula 4.

$$S_w = U_1 + U_2 + U_3 + U_4 \quad (4)$$

Figure 2C:
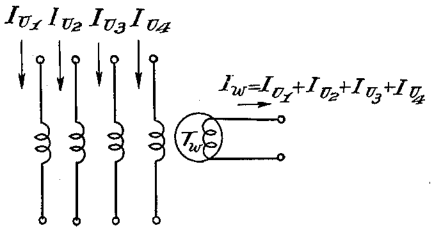
Figure 2D:
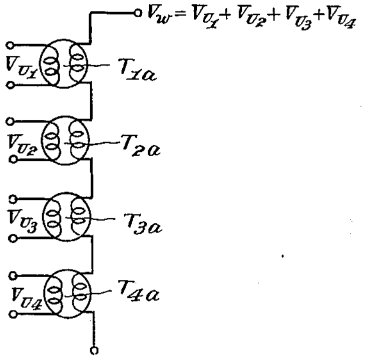

The linear circuit A for the collection of the output can be realized as shown in Fig. 2C and Fig. 2D. In Fig. 2C, a transformer having four primary windings and one secondary winding is used. The four signal currents $I_{U1}$, $I_{U2}$, $I_{U3}$ and $I_{U4}$ flowing out of the four nonlinear circuit elements are, respectively, supplied to the primary windings of the transformer and are collected together. The output current $I_w$ is taken out of the secondary winding. This type of linear circuit for collecting output is preferable when such nonlinear circuit elements $N_1$, $N_2$, $N_3$ and $N_4$ as shown in Fig. 1 have high output impedances. In Fig. 2D, four transformers $T_{1a}$, $T_{2a}$, $T_{3a}$ and $T_{4a}$, each having one primary winding and one secondary winding, are used. The four signal voltages $V_{U1}$, $V_{U2}$, $V_{U3}$ and $V_{U4}$ generated at the four nonlinear circuit elements are, respectively, supplied to the primary windings of said four transformers and are collected together. The output voltage $V_w$ is taken out of the series-connected four secondary windings of said four transformers. This type of linear circuit for collecting output is preferable when such nonlinear circuit elements $N_1$, $N_2$, $N_3$ and $N_4$ as shown in Fig. 1 have low output impedances.

As explained in connection with the circuit for distributing input, taking the characteristics of the input signals and the nonlinear circuit elements into consideration, we may well make a choice between the combinations of transformers, one for the circuits for distributing input and the other for the circuits for collecting output.

Now, in case the input signals $S_x$, $S_y$ and $S_z$ are impressed on the input terminals $t_x$, $t_y$ and $t_z$ in Fig. 1, the signals $U_1$, $U_2$, $U_3$ and $U_4$ generated at the nonlinear circuit elements are derived from the Formulas 1 and 2, as follows:

$$\left.\begin{aligned}
U_1 &= a_1u_1 + a_3u_1^3 + a_5u_1^5 + \dots \\
&= a_1(S_x+S_y+S_z) + a_3(S_x+S_y+S_z)^3 \\
&\quad + a_5(S_x+S_y+S_z)^5 + \dots \\
U_2 &= a_1(S_x-S_y-S_z) + a_3(S_x-S_y-S_z)^3 \\
&\quad + a_5(S_x-S_y-S_z)^5 + \dots \\
U_3 &= a_1(-S_x+S_y-S_z) + a_3(-S_x+S_y-S_z)^3 \\
&\quad + a_5(-S_x+S_y-S_z)^5 - \dots \\
U_4 &= a_1(-S_x-S_y+S_z) + a_3(-S_x-S_y+S_z)^3 \\
&\quad + a_5(-S_x-S_y+S_z)^5 + \dots
\end{aligned}\right\} \quad (5)$$

When these four signals are collected by the circuit for collecting output, the output signal $S_w$ in the Formula 4 becomes as follows:

$$S_w = S_x \cdot S_y \cdot S_z \cdot k \quad (6)$$

wherein $k$ is a symmetric formula of $S_x^2$, $S_y^2$ and $S_z^2$, which is given by the equation, $$K = 24a_3 + 80a_5(S_x^2 + S_y^2 + S_z^2) \quad (6')$$

If the input signals $S_x$, $S_y$ and $S_z$ are so small that the fifth power term and other higher power terms in Formula 5 can be neglected, the Formula 6 takes the following form.

$$S_w = 24a_3 \cdot S_x \cdot S_y \cdot S_z \quad (7)$$

Therefore, in any case, the output signal $S_w$ includes the triple product $S_x \cdot S_y \cdot S_z$, of the three input signals as a factor, and an electric triple multiplication circuit having the characteristics similar to the ring modulator, said modulator being essentially a double multiplication circuit, is obtained.

Figure 3:
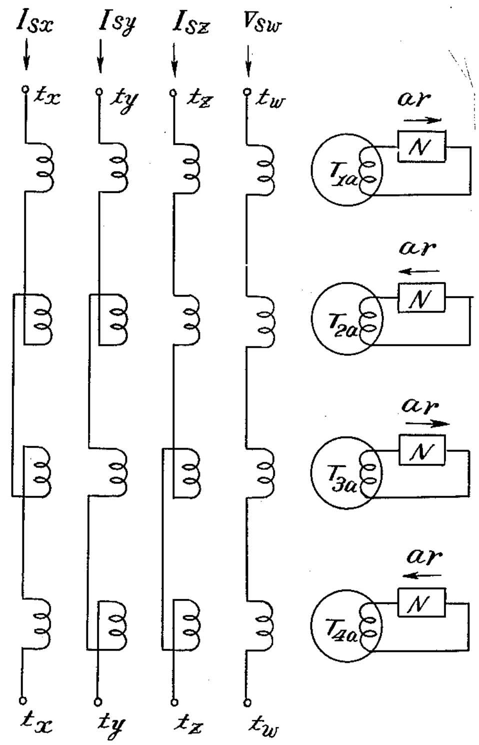
Fig. 3 is an electric connection diagram of one embodiment of the present invention.

Fig. 3 shows the electric connection diagram of a triple multiplication circuit (hereafter called E.T.M.) of the present invention, in which the circuit shown in Fig. 2B is used for the linear circuit for distributing input and the circuit shown in Fig. 2D is used for the linear circuit for collecting output. In Fig. 3, four transformers $T_{1a}$, $T_{2a}$, $T_{3a}$ and $T_{4a}$, each having five windings, are used. One winding of each transformer forms a closed circuit through a nonlinear circuit element N, and three pairs of input terminals $t_x$, $t_y$ and $t_z$ and one pair of output terminals $t_w$ are taken out by connecting the remaining four windings in series. When input signal currents $I_{sx}$, $I_{sy}$ and $I_{sz}$ are, respectively, supplied to the input terminals $t_x$, $t_y$ and $t_z$, the output signal voltage $V_{sw}$ taken out of terminals $t_w$ includes the triple product $I_{sx} \cdot I_{sy} \cdot I_{sz}$, of the three input currents as a factor, as is clear from the above-mentioned descriptions and from the Formula 6. The arrows in Fig. 3 indicate the direction of polarity, i.e., the forward direction, in case nonlinear circuit elements such as rectifiers are used. And in such a case, a filter circuit has to be inserted in the output side in order to eliminate even harmonic components. Furthermore, when cored transformers, in which windings are wound on easily saturable ferro-magnetic core such as ferrite or Permalloy core, are used in Fig. 3, the transformer's cores themselves can be used as the four nonlinear circuit elements N. In this case, the ferro-magnetic cores having nonlinear magnetization characteristics are utilized and the fifth windings of the transformers in Fig. 3, which are connected with the nonlinear circuit elements N, can be omitted, thereby the structure of the circuit is considerably simplified. The last-mentioned structure of the E.T.M. is shown in the part T.P.C. in Fig. 5. Furthermore, in the circuit as shown in Fig. 3, the four pairs of the terminals $t_x$, $t_y$, $t_z$ and $t_w$ have a completely symmetric relationship to each other, so that the choice as to what terminals are to be used for input and for output is quite free. For example, when the currents $I_{sy}$, $I_{sz}$ and $I_{sw}$ are, respectively, supplied to the terminals $t_y$, $t_z$ and $t_w$, voltage $V_{sx}$ including the triple product $I_{sy}\cdot I_{sz}\cdot I_{zw}$ as a factor will be generated at terminals $t_x$.

As mentioned already, the E.T.M. of the present invention can be applied for various purposes, by utilizing the above-explained features thereof. The E.T.M. of the present invention can naturally be used as a triple multiplication circuit in electric analogue computing devices and can also be used as a double modulation circuit. Since the function of a balanced modulator such as a ring modulator is essentially that of a double multiplication circuit, the double modulation process of a balanced type can be denoted as follows:

$S_w=S_z\cdot S_a$ and $S_a=S_x\cdot S_y$, wherein $S_x$ is the modulating wave, $S_y$ the first carrier wave, $S_a$ the modulated first carrier wave, $S_z$ the second carrier wave and $S_w$ the output wave. The E.T.M. of the present invention is capable of carrying out the above-mentioned two processes simultaneously.

Furthermore, since the E.T.M. of the present invention has a characteristic that the output signal $S_w$ is generated if and only if the three input signals $S_x$, $S_y$ and $S_z$ coexist, as can easily be seen from Formula 6, it can be used as a triple coincidence detector capable of detecting whether the three input signals coexist or not, and as a double coincidence gating circuit. Let it be assumed that $S_x$ is the signal to be gated and $S_y$ and $S_z$ are the gating signals which, respectively, take either of the two forms, present (non-zero) or absent (zero). Then, the signal $S_x$ is transferred to the output $S_w$ if and only if both of the two gating signals $S_x$ and $S_y$ are present and a double coincidence gating circuit is obtained.

Figure 4:
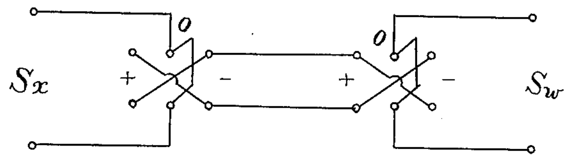
Fig. 4 is a schematic diagram illustrating the function of the electric triple multiplication circuit according to the present invention.

Furthermore, as can easily be seen from Formula 6, the relation between the polarities of the input signals and the polarity of the output signal becomes as shown by table in Fig. 6A. The polarity of the output signal $S_w$ is reversed when the polarity of either one of the input signals $S_x$, $S_y$ and $S_z$ is reversed. Accordingly, the E.T.M. of the present invention can be used as a two-staged triple throw polarity reversing switch circuit as shown in Fig. 4. Let it be assumed that $S_x$ is the input signal and $S_y$ and $S_z$ are the controlling signals which, respectively, take either one of the three values: positive polarity, absent or negative polarity. Then, the input signal $S_x$ is transferred to the output $S_w$ as if the two polarity reversing switches in Fig. 4 were moved by the controlling signals $S_y$ and $S_z$.

When binary digits 1 and 0, which are commonly used in digital computing devices, are expressed not by the presence or absence of signals but by the plus or minus polarity of signals, the polarities shown in Fig. 6A express binary digits as shown in Fig. 6B and this coincides with the truth table of a binary full adder circuit. Therefore, the E.T.M. of the present invention can be used as a binary full adder circuit in binary digital computers. Especially, the above-mentioned binary full adder circuit is very suitable for digital computers utilizing parametrically excited resonators or the "parametrons," which are more fully disclosed in copending application Serial Number 508,668, now Patent No. 2,948,818, filed on May 16, 1955, because binary digits are expressed by the polarity of oscillating waves of parametrons.

Figure 5:
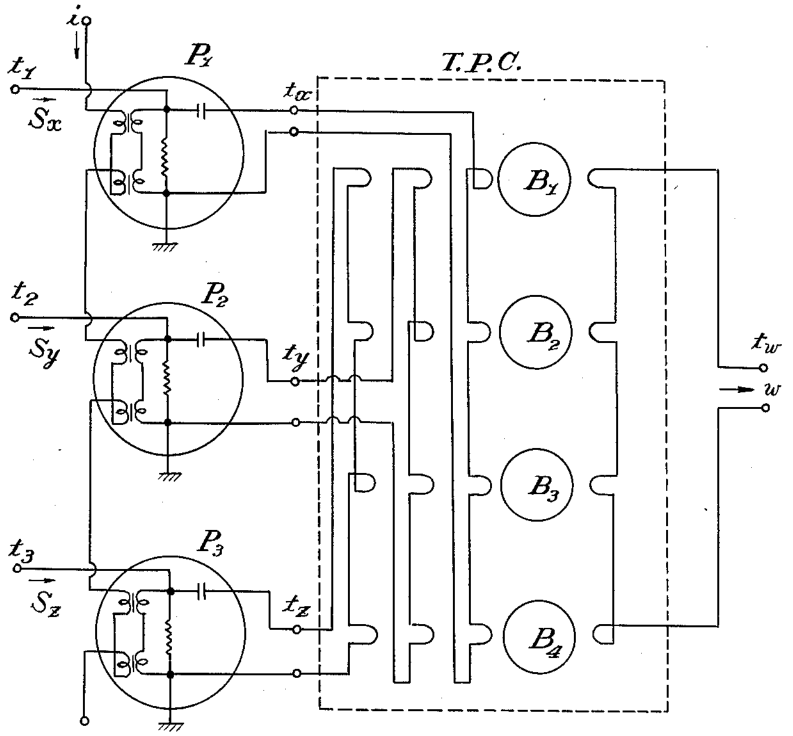
Fig. 5 is an electric connection diagram of a binary full adder circuit in which the triple multiplication circuit according to the present invention is utilized.

Fig. 5 show an example of the E.T.M. of the present invention applied to a binary full adder circuit of a computer utilizing "parametrons" $P_1$, $P_2$ and $P_3$. T.P.C. in Fig. 5 is the E.T.M. and is made of four transformers wound on four easily saturable ferro-magnetic cores $B_1$, $B_2$, $B_3$ and $B_4$. As mentioned already, the transformer's cores themselves are used as nonlinear circuit elements. The direction of the windings of said transformers seems to be different from that shown in Fig. 3. However, even when the direction of all of the windings connected to the terminals $t_x$ is reversed and all of the windings of the magnetic core $B_3$ are reversed, the result will be the same and there is no change in the action of the E.T.M. In Fig. 5, three respective input signals are impressed from terminals $t_1$, $t_2$, and $t_3$ and are amplified by the three parametrons $P_1$, $P_2$, and $P_3$, and are then supplied to the three input terminals $t_x$, $t_y$ and $t_z$ of the T.P.C. An output voltage, representing the full binary sum of the three input binary digits, is taken out of the output terminals $t_w$ of the T.P.C. In the experiments made, Cu—Zn ferrite cores of toroidal type having outer diameter 4 mm., inner 2 mm. and thickness 1 mm. were used for $B_1$, $B_2$, $B_3$ and $B_4$ and single turned coils were employed for each winding. From the input terminals $t_x$, $t_y$ and $t_z$ of the T.P.C. signal currents, each having the frequency 1 mc. and about 70 ma. intensity, were supplied by the "parametrons" and an output voltage, having the correct polarity and about 100 mv. of voltage, was obtained at the output terminals $t_w$. The accuracy of the hereinbefore described multiplier has been found to result in the development of an output signal which does not deviate by more than 10 percent from the product of the three input signals applied thereto. Moreover, when either one of the three currents supplied from terminals $t_x$, $t_y$ and $t_z$ was terminated, the output voltage appearing at the terminals $t_w$ decreased below 2 mv. Accordingly, the circuit shown in Fig. 5 can also be used as a gate circuit having the gating ratio of 1 to 50.

While the circuits as shown and described herein are admirably adapted to fulfill the objects and features of advantages previously enumerated as desirable, it is to be understood that the present invention is not to be limited to the specific features shown, but that the means and construction herein disclosed are susceptible of modification in form, proportion, and arrangement of parts without departing from the principle involved or sacrificing any of its advantages and the present invention is therefore claimed in embodiments of various forms, all coming within the scope of the claims which follow:

What is claimed is:

1. An electric multiplication circuit for obtaining the product of three input signals $x$, $y$, $z$ according to the following formula $$xyz=\frac{1}{24}\{(x+y+z)^3(x-y-z)^3(-x+y-z)^3+(-x-y+z)^3\}$$

which comprises four nonlinear circuit elements for producing third harmonics, a first linear circuit receiving said three input signals and distributing said signals among said four nonlinear elements through which said signals pass separately, and a second linear circuit receiving said distributed four signals and producing the output signal having the triple product of $x$, $y$, $z$ of said three input signals, the first linear circuit comprising three transformers, each having one primary winding and four secondary windings, the three input signals being impressed separately on the primary winding of each one of said three transformers, and the four nonlinear circuit elements being coupled separately with the series-connected secondary windings of said three transformers.

2. An electric multiplication circuit for obtaining the product of three input signals $x$, $y$, $z$ according to the following formula $$xyz=\frac{1}{24}\{(x+y+z)^3(x-y-z)^3(-x+y-z)^3+(-x-y+z)^3\}$$

which comprises four nonlinear circuit elements for producing third harmonics, a first linear circuit receiving said three input signals and distributing said signals among said four nonlinear elements through which said signals pass separately, and a second linear circuit receiving said distributed four signals and producing the output signal having the triple product of $x$, $y$, $z$ of said three input signals, the first linear circuit being composed of four transformers, each having three primary windings and one secondary winding, each one of the three input signals being separately impressed on series-connected primary windings of the four transformers, and the four nonlinear circuit elements coupled separately with said secondary winding of each one of said four transformers.

3. An electric multiplication circuit for obtaining the product of three input signals $x$, $y$, $z$ according to the following formula $$xyz=\frac{1}{24}\{(x+y+z)^3(x-y-z)^3(-x+y-z)^3+(-x-y+z)^3\}$$

which comprises four nonlinear circuit elements for producing third harmonics, a first linear circuit receiving said three input signals and distributing said signals among said four nonlinear elements through which said signals pass separately, and a second linear circuit receiving said distributed four signals and producing the output signal having the triple product of $x$, $y$, $z$ of said three input signals, the second linear circuit being composed of one transformer having four primary windings and one secondary winding, the four signals passed separately through said four nonlinear circuit elements impressed separately on each one of said primary windings of said transformer, and the output signal being taken from the secondary winding of said transformer.

4. An electric multiplication circuit for obtaining the product of three input signals $x$, $y$, $z$ according to the following formula $$xyz=\frac{1}{24}\{(x+y+z)^3(x-y-z)^3(-x+y-z)^3+(-x-y+z)^3\}$$

which comprises four nonlinear circuit elements for producing third harmonics, a first linear circuit receiving said three input signals and distributing said signals among said four nonlinear elements through which said signals pass separately, and a second linear circuit receiving said distributed four signals and producing the output signal having the triple product of $x$, $y$, $z$ of said three input signals, the second linear circuit being composed of four transformers, each having one primary winding and one secondary winding, the respective secondary windings being connected in series, the four signals passed separately through said four nonlinear circuit elements being impressed separately on the primary winding of each one of said four transformers, and the output signal being taken from the series-connected secondary windings of said four transformers.

5. An electric multiplication circuit for obtaining the product of three input signals $x$, $y$, $z$ according to the following formula $$xyz=\frac{1}{24}\{(x+y+z)^3(x-y-z)^3(-x+y-z)^3+(-x-y+z)^3\}$$

which comprises four nonlinear circuit elements for producing third harmonics, a first linear circuit receiving said three input signals and distributing said signals among said four nonlinear elements through which said signals pass separately, and a second linear circuit receiving said distributed four signals and producing the output signal having the triple product of $x$, $y$, $z$ of said three input signals, the first and second linear circuits comprising four transformers each having five windings, the four nonlinear circuit elements being separately connected with one of the windings of each one of said four transformers, the three input signals being separately impressed on three of the windings of said four transformers, said three windings respectively connected in series, and the output signal being taken from the remaining windings of said four transformers, said remaining windings being connected in series.

6. An electric multiplication circuit for obtaining the product of three input signals $x$, $y$, $z$ according to the following formula $$xyz=\frac{1}{24}\{(x+y+z)^3(x-y-z)^3(-x+y-z)^3+(-x-y+z)^3\}$$

which comprises four nonlinear circuit elements for producing third harmonics, a first linear circuit receiving said three input signals and distributing said signals among said four nonlinear elements through which said signals pass separately, and a second linear circuit receiving said distributed four signals and producing the output signal having the triple product of $x$, $y$, $z$ of said three input signals, the first and second linear circuits comprising windings wound on four ferromagnetic cores, each having substantially the same characteristics and each having four windings, said ferro-magnetic cores serving as the four nonlinear circuit elements having substantially the same characteristics, the three input signals being separately impressed on three of said four windings on each of said cores, the said three windings being respectively connected in series, and the output signal being taken out of the remaining windings, the remaining winding of each of said cores being connected in series.

References Cited in the file of this patent

UNITED STATES PATENTS

| | | |
|---|---|---|
| 2,244,369 | Martin | June 3, 1941 |
| 2,674,409 | Lakatos | Apr. 6, 1954 |
| 2,700,135 | Tolles | Jan. 18, 1955 |

OTHER REFERENCES

Electronic Engineering (Mynall), June 1947; page 179.

The Review of Scientific Instruments (Haupt), volume 21, No. 8. August 1950, pages 683–686.

Electronic Analog Computers (Korn and Korn), 1952; page 214.

Proc. of Inst. of Elec. Engr. (English), Davis et al. October 1953, pp. 469–471, volume 100, part II.

Journal of the Franklin Institute (Ryder), page 427, May 1955.